US009566832B2

(12) United States Patent
Sherman et al.

(10) Patent No.: US 9,566,832 B2
(45) Date of Patent: Feb. 14, 2017

(54) HUB ADAPTER AND CENTRAL TIRE INFLATION SYSTEM INCLUDING SAME

(71) Applicant: Hutchinson SA, Paris (FR)

(72) Inventors: Matthew P. Sherman, Elkins Park, PA (US); Michael G. Hartman, Lansdale, PA (US); Olivier Noblanc, Levittown, PA (US)

(73) Assignee: Hutchinson SA, Paris (FR)

( * ) Notice: Subject to any disclaimer, the term of this patent is extended or adjusted under 35 U.S.C. 154(b) by 13 days.

(21) Appl. No.: 14/572,827

(22) Filed: Dec. 17, 2014

(65) Prior Publication Data

US 2015/0165847 A1 Jun. 18, 2015

Related U.S. Application Data

(60) Provisional application No. 61/917,086, filed on Dec. 17, 2013.

(51) Int. Cl.
| | |
|---|---|
| *B60C 29/02* | (2006.01) |
| *B60C 23/00* | (2006.01) |
| *B60C 29/06* | (2006.01) |

(52) U.S. Cl.
CPC ........... *B60C 23/003* (2013.01); *B60C 29/064* (2013.04)

(58) Field of Classification Search
CPC ...... B60C 23/00; B60C 23/003; B60C 29/064; B60C 29/02
USPC .......................................... 152/427, 415–418
See application file for complete search history.

(56) References Cited

U.S. PATENT DOCUMENTS

| | | | |
|---|---|---|---|
| 5,313,996 A | 5/1994 | Bragg | |
| 6,412,525 B1 * | 7/2002 | Nienhaus | B60C 23/003 141/38 |
| 6,474,383 B1 * | 11/2002 | Howald | B60C 23/003 152/416 |
| 8,042,585 B2 * | 10/2011 | Isono | B60C 23/12 152/416 |
| 8,087,439 B2 * | 1/2012 | Hobe | B60C 29/02 152/416 |
| 8,453,692 B2 * | 6/2013 | Saadat | B60B 1/08 152/415 |
| 2009/0205764 A1 | 8/2009 | Pionke | |
| 2009/0283190 A1 | 11/2009 | Padula et al. | |

(Continued)

OTHER PUBLICATIONS

International Search Report dated Mar. 31, 2015 for corresponding International Application PCT/US2014/070699.

(Continued)

*Primary Examiner* — S. Joseph Morano
*Assistant Examiner* — Jean Charleston
(74) *Attorney, Agent, or Firm* — K&L Gates LLP (57) ABSTRACT

A system. The system includes a wheel, a hub adapter and a valve assembly. The wheel defines a first air passage having a first end and a second end. The first end of the first air passage is at an outward side of the wheel. The hub adapter is connected to the wheel and defines a tire side air passage. A first end of the tire side air passage is coaxially aligned with the first end of the first air passage. The valve assembly is connected to the hub adapter. The valve assembly includes a valve and defines a hub side air passage and a tire side air passage. A first end of the tire side air passage of the valve assembly is coaxially aligned with a second end of the tire side air passage of the hub adapter.

20 Claims, 6 Drawing Sheets

(56) References Cited

U.S. PATENT DOCUMENTS

2011/0221261 A1    9/2011  Eaton et al.

OTHER PUBLICATIONS

International Preliminary Report on Patentability dated Jun. 30, 2016 for corresponding International Application PCT/US2014/070699.

* cited by examiner

HUB ADAPTER AND CENTRAL TIRE INFLATION SYSTEM INCLUDING SAME

CROSS-REFERENCE TO RELATED APPLICATION

This application claims the benefit under 35 U.S.C. §119 (e) of the earlier filing date of U.S. Provisional Patent Application No. 61/917,086 filed on Dec. 17, 2013, the contents of which are hereby incorporated by reference in their entirety.

BACKGROUND

This application discloses an invention which is related, generally and in various embodiments, to a hub adapter and a central tire inflation system including the hub adapter.

Central tire inflation (CTI) systems which are utilized to control the air pressure in tires mounted to wheels of a vehicle are known in the art. In general, CTI systems include a compressor or other source of air, individual valve assemblies for each tire (or set of tires) which control the flow or air from the compressor to the tires (inflation) and from the tire back to the inflation system on the vehicle or directly to the atmosphere (deflation), and an air passage system which carries air from the compressor to the valve assemblies to the tires (inflation) and from the tires to the valve assemblies via the vehicle inflation system to the atmosphere (deflation). The portion of the air passage system from the compressor to the valve assemblies is commonly referred to as the hub side of the air passage system and the portion of the air passage system from the valve assemblies to the tire chambers is commonly referred to as the tire side of the air passage system.

The valve assemblies are typically mounted to an outside face of the corresponding wheels, and each valve assembly typically includes a valve (e.g., an actuator, a positioner and a body) and two air passageways connected to the valve. For each valve assembly, one of the air passageways typically extends from the valve to an outer surface of the valve assembly and is utilized to connect the valve to the hub side of the corresponding air passage system. The other air passageway extends from the valve to an outer surface of the valve assembly and is utilized to connect the valve to the tire side of the air passage system.

Typically, the air passage system includes piping, tubing, hosing or the like from the compressor and central manifold to each hub of the vehicle. The hub end of the piping, tubing, hosing or the like is known as a hub port. In some air passage systems piping, tubing, hosing or the like is utilized to connect the hub ports to the corresponding valve assemblies, and are also utilized to connect the valve assemblies to corresponding tire chambers. In other air passage systems air passageways within the wheels are utilized to connect the hub ports to the valve assemblies, and are also utilized to connect the valve assemblies to corresponding tire chambers.

A host of different valve assemblies are commercially available, and it is common for one valve assembly to have air passageways terminate at different relative locations at the exterior surface of the valve assembly than those of a second valve assembly. Thus, when a wheel with a hub side internal air passageway and/or a tire side air passageway has been designed and manufactured, the hub side internal air passageway has generally been configured to align with the hub side air passageway of a specific valve assembly when the valve assembly is connected to the outside face of the wheel and/or the tire side internal air passageway has generally been configured to align with the tire side air passageway of the specific valve assembly when the valve assembly is connected to the outside face of the wheel.

For various reasons, a party may wish to use a particular valve assembly and/or a particular wheel. However, because of the one-to-one correspondence between a specific wheel design (a specific configuration of the wheel's hub side and/or tire side internal air passageways) and a specific valve assembly, a corresponding valve assembly may not be currently available for the desired wheel. Similarly, a corresponding wheel may not be currently available for the desired valve assembly. In such instances, the party has often had to compromise because the time and/or cost associated with designing and manufacturing a new wheel and/or a new valve assembly has been too long and/or too expensive.

BRIEF DESCRIPTION OF THE DRAWINGS

Various embodiments of the invention are described herein in by way of example in conjunction with the following figures, wherein like reference characters designate the same or similar elements.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 1:
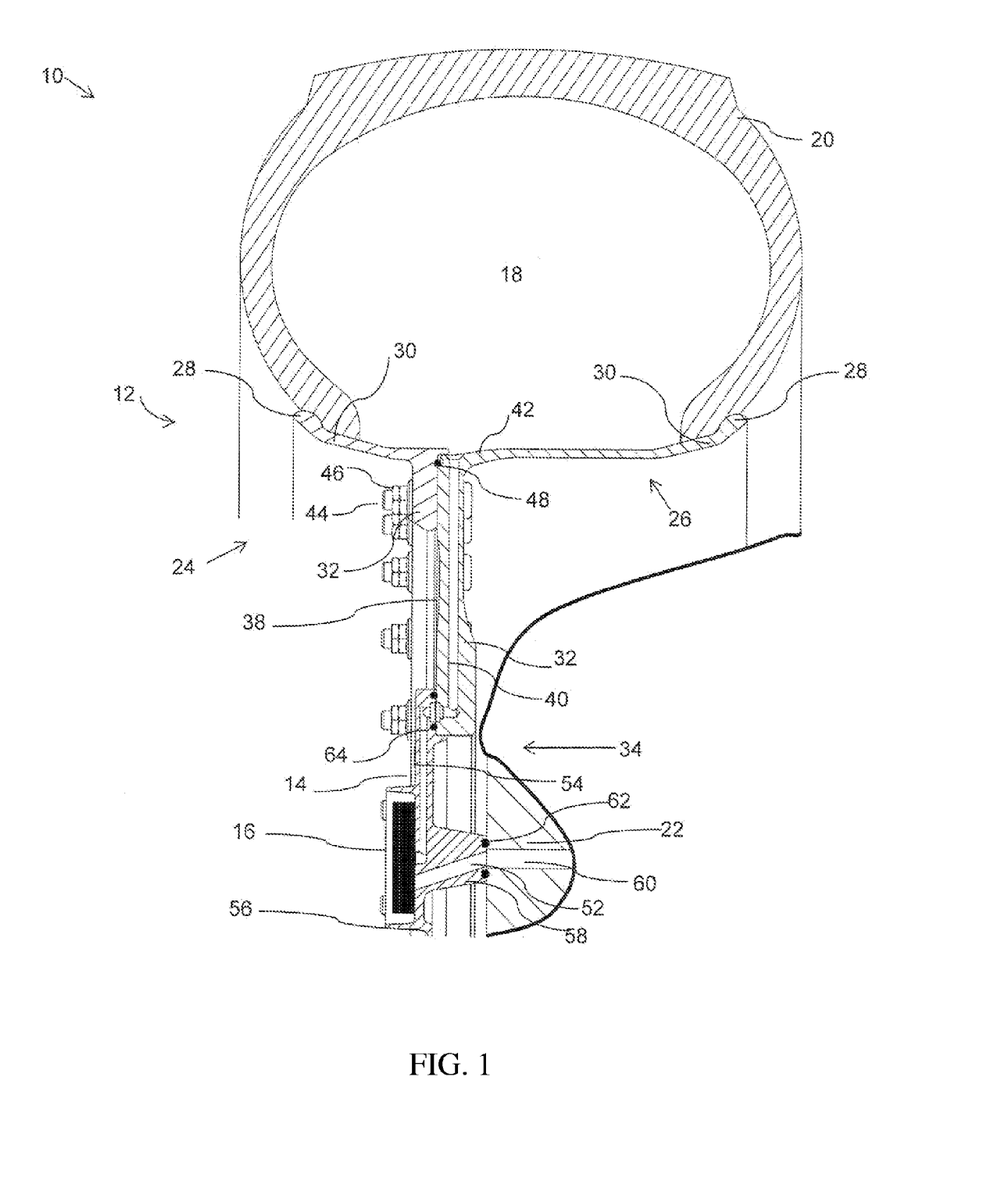
FIG. 1 illustrates various embodiments of a central tire inflation system.
Figure 2:
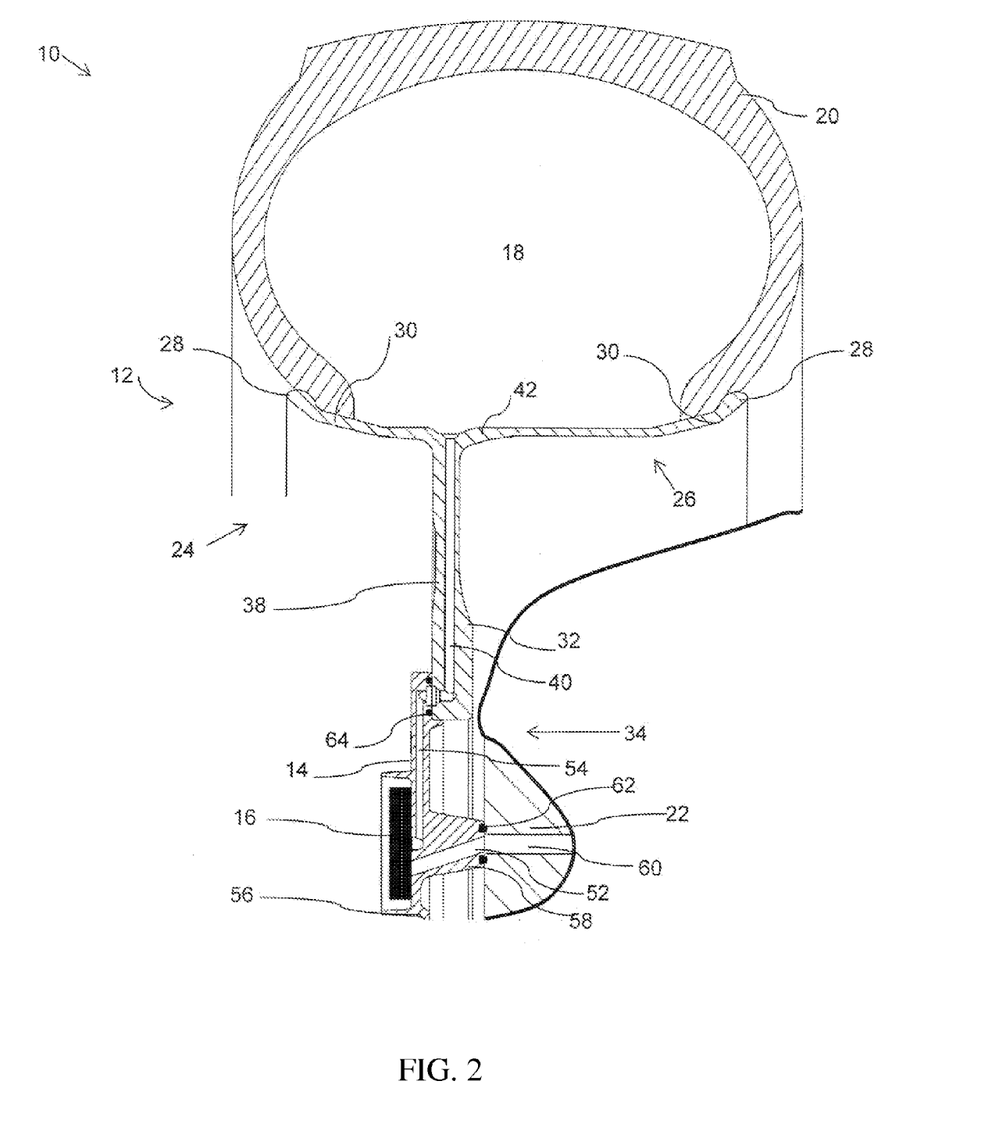
FIG. 2 illustrates other embodiments of a central tire inflation system.
Figure 5:
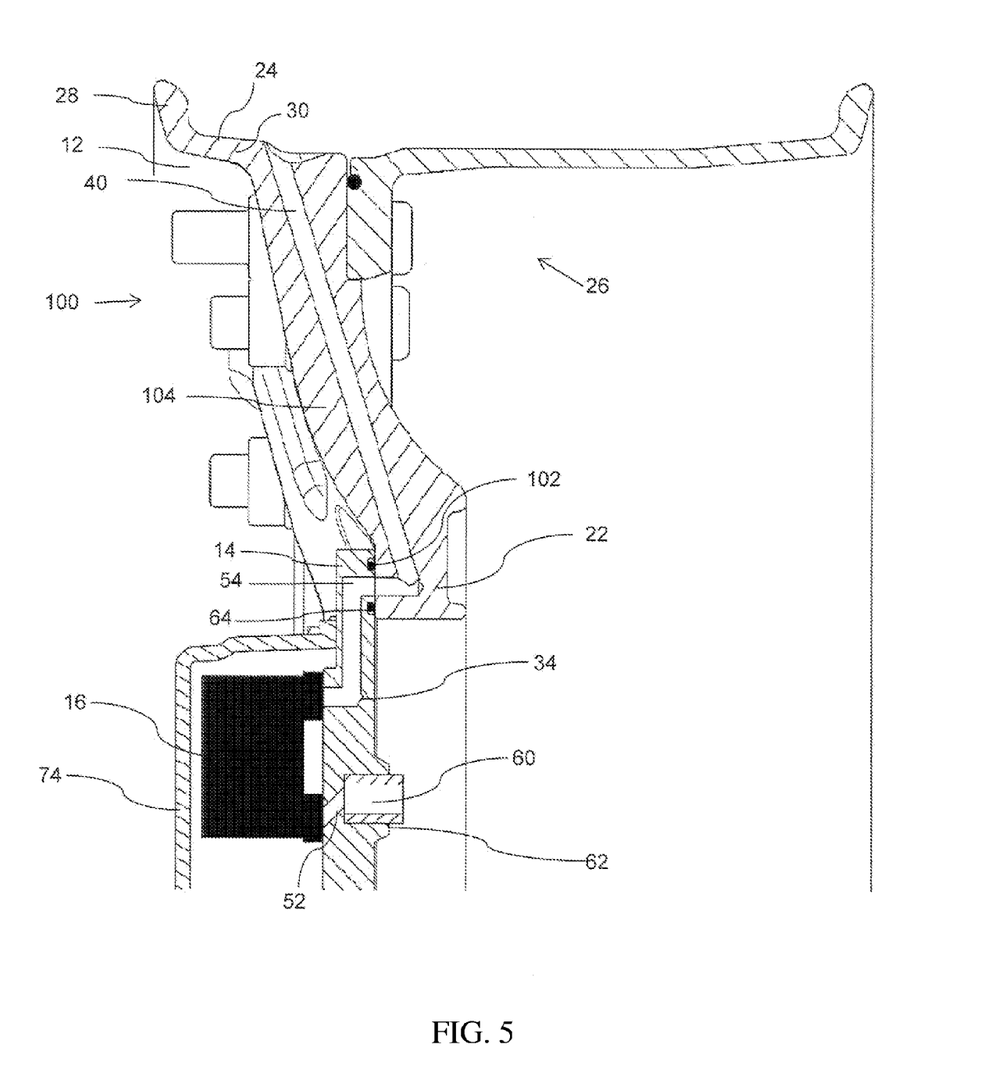
FIG. 5 illustrates various embodiments of another central tire inflation system.
Figure 6:
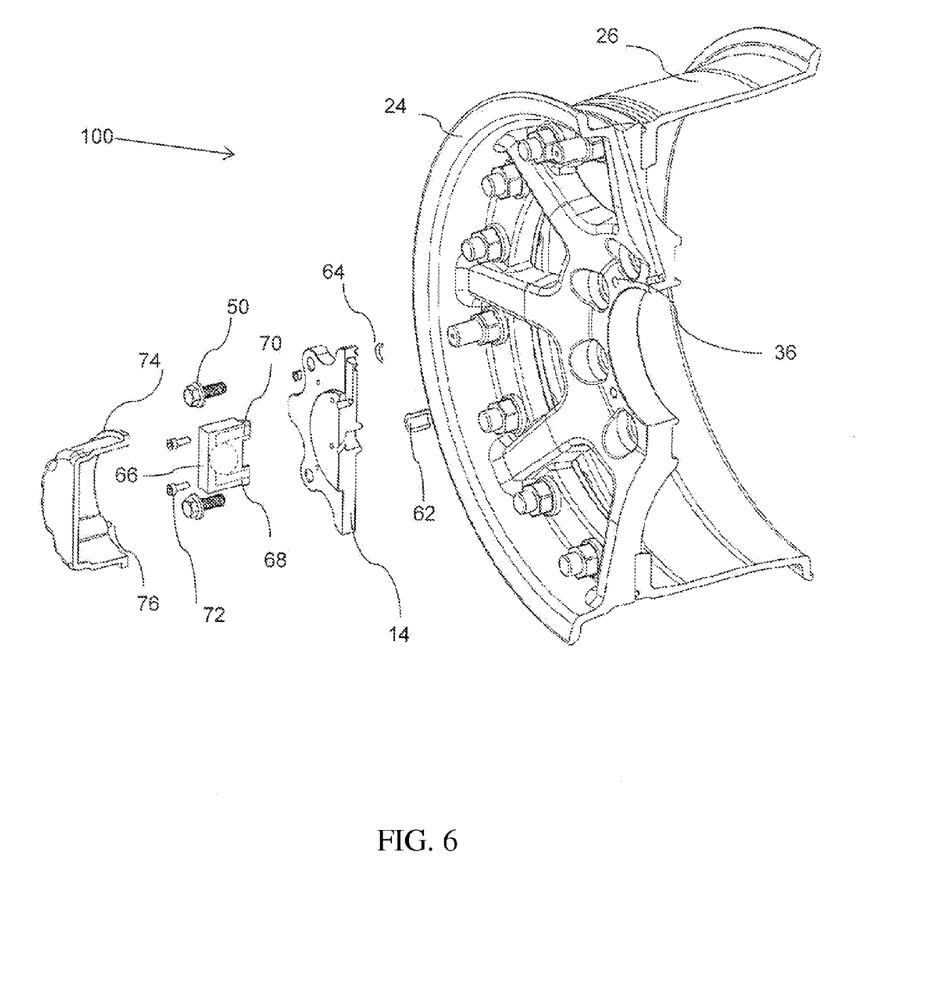
FIG. 6 illustrates a partially exploded view of the central tire inflation system of FIG. 5.

FIG. 1 illustrates various embodiments of a central tire inflation system 10. The CTI system 10 includes a wheel 12, a hub adapter 14 and a valve assembly 16. The CTI system 10 may be utilized to control air into or out of a chamber 18 of a tire 20 mounted on the wheel 12. Although the wheel 12 is shown in FIG. 1 as being a two-piece wheel, it will be appreciated that according to other embodiments the wheel 12 may be a wheel other than a two-piece wheel (e.g., a one-piece wheel, a three-piece wheel, etc.). For example, as shown in FIG. 2, the wheel 12 may be a one-piece wheel. For purposes of simplicity, only a portion of the CTI system 10 is shown in FIG. 1 (e.g., hub side components such as the compressor and the central manifold are not shown), and not all of the features and/or details of the CTI system 10 are shown in FIG. 1. However, it will be appreciated that similar or identical features are shown in FIGS. 5 and 6 and thus aid in the understanding of the CTI system 10.

The wheel 12 is configured to be connected to a vehicle hub 22 and may be fabricated from any suitable material.

For example, according to various embodiments, the wheel 12 may be fabricated from aluminum. According to other embodiments, the wheel 12 may be fabricated from steel, from an alloy, from a composite, etc.

For the embodiments shown in FIG. 1, the wheel 12 includes an outer rim 24 and an inner rim 26. The outer rim 24 includes a flared flange section 28, a barrel section 30 and a transverse face section 32 which defines a plurality of similarly sized openings therethrough (not shown in FIG. 1 for purposes of simplicity) proximate the barrel section 30. The inner rim 26 includes a flared flange section 28, a barrel section 30 and a transverse face section 32 which defines a plurality of similarly sized openings therethrough (not shown in FIG. 1 for purposes of simplicity) proximate the barrel section 30. The transverse face section 32 of the inner rim 26 also defines a central opening 34 therethrough, a plurality of openings therethrough proximate the central opening 34 (not shown in FIG. 1 for purposes of simplicity) for receiving studs of the vehicle hub 22 when the wheel 12 is connected to the vehicle hub 22, and a plurality of threaded receptacles 36 (See, e.g., FIG. 6). According to various embodiments, the threaded receptacles 36 pass through the transverse face section 32 of the inner rim 26 proximate the central, opening 34. According to other embodiments, the threaded receptacles 36 extend from an axially outward surface 38 of the transverse face section 32 of the inner rim 26 into the transverse face section 32 of the inner rim 26 and toward, but not through, an opposite surface of the transverse face 32 of the inner rim 26.

As shown in FIG. 1, the barrel section 30 and the transverse face section 32 of the inner rim 26 collectively define an air passage 40. The air passage 40 extends from the axially outward surface 38 of the transverse face section 32 of the inner rim 26 to a radially outward surface 42 of the barrel section 30 of the inner rim 26. Thus, one end of the air passage 40 may be referenced as the axially outward end and the other end of the air passage 40 may be referenced as the radially outward end.

The outer rim 24 is connected to the inner rim 26 by a plurality of threaded bolts 44 which have corresponding nuts 46 threadedly connected thereon. The threaded bolts 44 pass through the respective similarly sized openings defined by the transverse face sections 32 of the inner and outer rims 24, 26. A sealing member 48 such as, for example, a compressible o-ring is utilized to seal the outer rim 24 and the inner rim 26 together and operates to prevent air from escaping out of the tire chamber 18.

The hub adapter 14 is connected to the transverse face section 32 of the inner rim 26. The hub adapter 14 may be connected to the transverse face section 32 of the inner rim 26 in any suitable manner. For example, according to various embodiments, the hub adapter 14 defines a plurality of openings therethrough (See e.g., FIG. 6), and threaded bolts or screws 50 (See e.g., FIG. 6) which pass through, the openings are threadedly connected to the corresponding threaded receptacles 36 defined by the transverse face section 32 of the inner rim 26. The hub adapter 14 spans the central opening 34 and may be fabricated from any suitable material. For example, according to various embodiments, the hub adapter 14 may be fabricated from aluminum. According to other embodiments, the hub adapter 14 may be fabricated from steel from an alloy, from a composite etc.

The hub adapter 14 defines a hub side air passage 52 and a tire side air passage 54. The hub side air passage 52 extends through the hub adapter 14 from an axially outward surface 56 of the hub adapter 14 to an opposite (axially inward) surface 58 of the hub adapter 14. When the hub adapter 14 is connected to the transverse face section 32 of the inner rim 26, the axially inward end of the hub side air passage 52 is coaxially aligned with a hub port 60 of the CTI system 10. For the embodiments shown in FIG. 1, hub port 60 is at the center of the end of the vehicle hub 22 (i.e. at the center of the hub). A sealing member 62 is utilized to seal around the connection between the hub side air passage 52 and the hub port 60. The sealing member 62 may be any suitable type of sealing member. For example, according to various embodiments, the sealing member 62 is a compressible sleeve. When the hub portion 14 is mounted to the wheel 12 and the wheel 12 is mounted on the vehicle hub 22, the sealing member 62 may compress and seal around the hub port 60. The hub adapter 14 can be either first mounted onto the wheel 12 before the wheel 12 is mounted to the vehicle hub 22, or can be attached to the wheel 12 after the wheel 12 has been mounted to the vehicle hub 22.

Similarly, the tire side air passage 54 extends through the hub adapter 14 from the axially outward surface 56 of the hub adapter 14 to the opposite (axially inward) surface 58 of the hub adapter 14. When the hub adapter 14 is connected to the transverse face section 32 of the inner rim 26, the axially inward end of the tire side air passage 54 is coaxially aligned with the axially outward end of the air passage 40. A sealing member 64 is utilized to seal around the connection between the tire side air passage 54 and the axially outward end of the air passage 40. The sealing member 64 may be any suitable type of sealing member. For example, according to various embodiments, the sealing member 64 is a compressible o-ring. According to various embodiments, the sealing member 64 is at least partially recessed within the hub adapter 14 and/or the transverse face section 32 of the inner rim 26.

According to various embodiments, the hub adapter 14 defines threaded receptacles (not shown for purposes of simplicity) which extend from the axially outward surface 56 of the hub adapter 14 into the hub adapter 14 and toward, but not through, the axially inward surface 58 of the hub adapter 14.

The valve assembly 16 is connected to the axially outward surface 56 of the hub adapter 14. The valve assembly 16 can be connected to the hub adapter 14 before or after the hub adapter 14 is connected to the wheel 12. Although the valve assembly 16 is only shown as a box in FIG. 1 for purposes of simplicity, it will be appreciated that the valve assembly 16 includes a valve 66 (See, e.g., FIG. 6), a hub side air passage 68 (See, e.g., FIG. 6) connected to the valve 66, and a tire side air passage 70 (See, e.g., FIG. 6) connected to the valve 66. It will also be appreciated that the "internal" components of the valve assembly 16 shown in FIG. 6 (i.e., the valve 66, the hub side air passage 68 and the tire side air passage 70) are merely simplified representations of the "internals" of the valve assembly 16, that the CTI system 10 can include different valve assemblies 16 for different applications, and that the internal configurations of such valve assemblies 16 can vary. The valve assembly 16 may be connected to the huh adapter 14 in any suitable manner. For example, according to various embodiments, the valve assembly 16 defines a plurality of openings therethrough (See e.g., FIG. 6), and threaded bolts or screws 72 which pass through the openings are threadedly connected to the corresponding threaded receptacles defined by the hub adapter 14. According to various embodiments, the valve 66 is positioned within an exterior surface of the valve assembly 16 (See, e.g., FIGS. 5 and 6).

According to various embodiments, the valve assembly 16 may be surrounded by a protective cover 74 (See, e.g., FIGS. 5 and 6) which is connected to the hub adapter 14. The protective cover 74 may be connected to the hub adapter 14 in any suitable manner. For example, according to various embodiments, the protective cover 74 defines a plurality of openings therethrough (not shown for purposes of simplicity) and threaded bolts or screws 76 (See FIG. 6) which pass through the openings are threadedly connected to other corresponding threaded receptacles defined by the hub adapter 14.

Although the embodiments of the CTI system 10 are shown in the context of the CTI system 10 being associated with the inner rim 26 of the wheel 12 (e.g., the hub member 14 is connected to the inner rim 26 and the air passage 40 is defined by the inner rim 26), it will be appreciated that according to other embodiments, the wheel 12 can be configured in an opposite manner such that the CTI system 10 is associated with the outer rim 24 (e.g., the hub member 14 is connected to the outer rim 24 and the air passage 40 is defined by the outer rim 24 as shown, for example, in FIGS. 5 and 6).

FIG. 2 illustrates other embodiments of the central tire inflation system 10. The system 10 of FIG. 2 is similar to the system 10 of FIG. 1, but is different in that the wheel 12 is a single-piece wheel. For the embodiments shown in FIG. 2, the barrel section 30 and the transverse face section 32 of the single-piece wheel collectively define an air passage 40. The air passage 40 extends from the axially outward surface 38 of the transverse face section 32 of the single-piece wheel to a radially outward surface 42 of the barrel section 30 of the single-piece wheel. Thus, one end of the air passage 40 may be referenced as the axially outward end and the other end of the air passage 40 may be referenced as the radially outward end.

Figure 3:
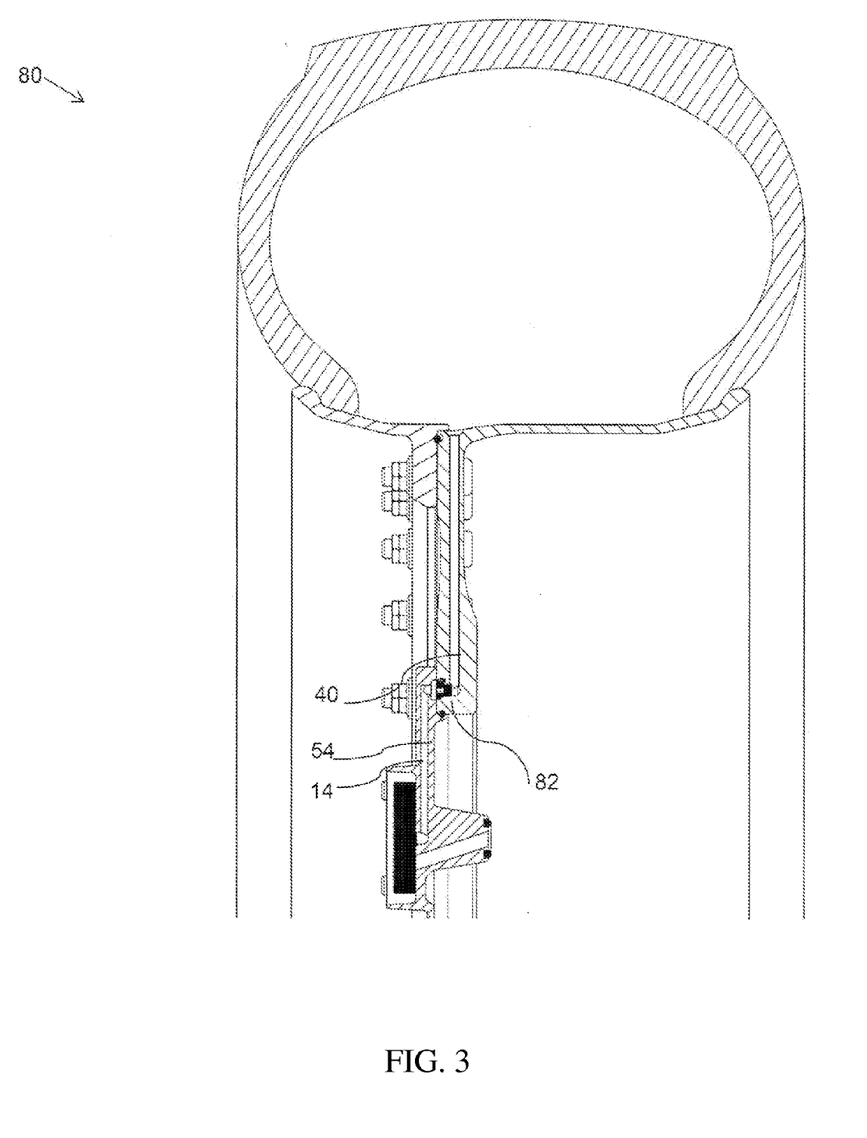
FIG. 3 illustrates yet other embodiments of a central tire inflation system.

FIG. 3 illustrates various embodiments of a central tire inflation system 80 according to various embodiments. The CTI system 80 is similar to the CTI system 10 of FIG. 1 but is different in that the CTI system 80 also includes a valve 82 positioned, between the hub adapter 14 and the air passage 40. Although the valve 82 is shown in FIG. 3 in the context of the air passage 40 being defined by the inner rim 26, it will be appreciated that for embodiments where the wheel 12 has a different configuration (e.g., where the air passage 40 is defined by the outer rim 24, where the air passage 40 is defined by a single-piece wheel, etc.), the CTI system may still include a valve 82 positioned between the hub adapter 14 and the air passage 40.

The valve 82 may be any suitable type of valve which is configured to maintain the pressure in the chamber 18 of the tire 20 if the hub adapter 14 is removed from the wheel 12 and/or the valve assembly 16 is removed from the hub adapter 14. For example, according to various embodiments, the valve is a flow controlled check valve. Although the valve 82 is shown in FIG. 3 as being positioned within the transverse face section 32 of the inner rim 26, it will be appreciated that according to other embodiments the valve 82 may be positioned partially within and partially external to the transverse face section 32 of the inner rim 32. Similarly, it will be appreciated that for embodiments where the wheel 12 has a different configuration (e.g., where the air passage 40 is defined by the outer rim 24, where the air passage 40 is defined by a single-piece wheel, etc.), the valve 82 may be positioned partially within and partially external to the transverse face section 32 of the outer rim 24, partially within and partially external to the transverse face section 32 of single-piece wheel, etc.

The valve permits air to flow from the tire side air passage 54 of the hub adapter 14, through the valve 82, into the air passage 40 and into the tire chamber 18. When the valve assembly 16 is removed from the hub adapter 14 and/or the hub adapter 14 is removed from the wheel 12, the valve 82 operates to prevent air from escaping from the tire chamber 18.

Figure 4:
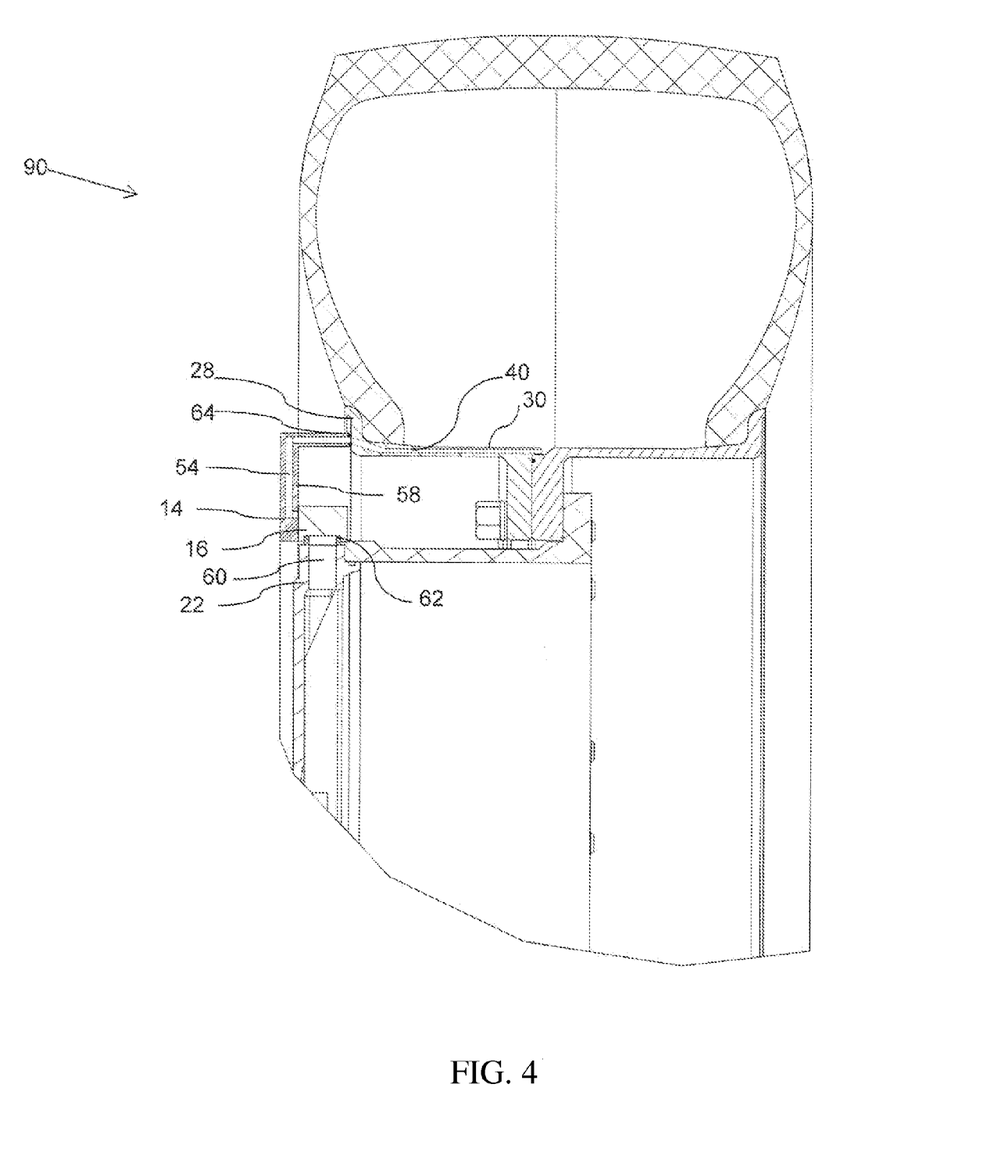
FIG. 4 illustrates various embodiments of another central tire inflation system.

FIG. 4 illustrates various embodiments of a central tire inflation system 90. The CTI system 90 is similar to the CTI system 10 of FIG. 1 in that it includes the same basic components (e.g., wheel 12, hub adapter 14, valve assembly 16, etc.) but is different in that some of the components of the CTI system 90 are configured and/or positioned differently than in the CTI system 10.

For example, as shown in FIG. 4, the wheel 12 is configured differently in that the air passage 40 defined by the wheel 12 is located within the flared flange section 28 and/or the barrel section 30 of the outer rim 24. The hub member 14 is connected to the flared flange section 28 of the outer wheel 24, and the hub member 14 includes a tire side air passage 54 but does not include a hub side air passage. An end of the tire side air passage 54 of the hub member 14 is still coaxially aligned with amend of the air passage 40 but is configured differently than it is in the CTI system 10. With this configuration, the sealing member 64 is also located at a different position than it is in the CTI system 10.

Additionally, the valve assembly 16 is connected to the axially inward surface 58 of the hub member 14 and has a different inlet/outlet configuration than it does in the CTI system 10. The vehicle hub 22 is a protruding vehicle hub, and the hub port 60 is a radial, hub port. Thus, although the hub port 60 is still within the central opening of the wheel 12, it is not located at the center of the hub. With this configuration, although the sealing member 62 still operates to compress and seal around the radial hub port 60, the sealing member 62 is located in a different relative position than it is in the CTI system 10.

Although all of the air passages shown in FIGS. 1-4 are shown as being comprised of one or more straight lines which run parallel to and/or perpendicular to an axis of rotation of the wheel 12 for purposes of simplicity, it will be appreciated that according to various embodiments, any of air passages can run in directions other than parallel to and/or perpendicular to an axis of rotation of the wheel 12.

FIG. 5 illustrates various embodiments of another the central tire inflation system 100 and FIG. 6 is a partially exploded view of the CTI system 100. The system 100 is similar to the system 10 of FIG. 1 in that it includes many of the same basic components (wheel 12, hub adapter 14, valve assembly 16, etc.) but is different in that some of the components of the CTI system 100 are configured and/or positioned differently than in the CTI system 10.

For example, as shown in FIGS. 5 and 6, the CTI system 100 is associated with the outer rim 24 (e.g., the hub member 14 is connected to the outer rim 24 and the air passage 40 is defined by the outer rim 24). The wheel 12 is configured differently in that the outer rim 24 defines the central opening 34, and also defines the air passage 40. The wheel 12 is also different in that the outer rim 24 includes a plurality of spokes 104 which extend from the barrel section 30 toward the central opening 34. For the embodiments shown in FIGS. 5 and 6, the air passage 40 extends from an axially outward surface 102 of the transverse face section 32 of the outer rim 24 to a radially outward surface 104 of the barrel, section 30 of the outer rim 24. According to other embodiments, the air passage 40 extends from an axially outward surface 102 of the transverse face section 32 of the outer rim 24, toward the barrel section 30 of the outer rim 24 and to an interior surface of the flared flange section 28. As also shown in FIGS. 5 and 6, the portion of the air passage 40 which extends radially outward can run in a direction other than perpendicular to an axis of rotation of the wheel 12.

The hub member 14 is connected to the transverse face section 32 of the outer wheel 24, and the hub member 14 includes a tire side air passage 54 and a hub side air passage 52. As shown in FIG. 5, at least a portion of the hub side air passage 52 can run in a direction other than perpendicular to an axis of rotation of the wheel 12.

In view of the various embodiments of the hub adapter 14 as described hereinabove, it will be appreciated that various embodiments of the hub adapter 14 provide the flexibility of being able to use any valve assembly 16 with a given wheel 12, even if the inlet/outlet ports of the valve assembly 16 do not align with a tire side air passage and/or a hub side air passage associated with the wheel 12. Similarly, the various embodiments of the hub adapter 14 provide the flexibility of being able to use any wheel 12 with a given valve assembly 16, even if a tire side air passage and/or a hub side air passage associated with the wheel 12 do not align with the inlet/outlet ports of the valve assembly 16.

Nothing in the above description is meant to limit the invention to any specific materials, geometry, or orientation, of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the described invention. Accordingly, it is understood that the drawings and the descriptions herein are proffered only to facilitate comprehension of the invention and should not be construed to limit, the scope thereof.

What is claimed is:

1. A system, comprising:
    a wheel, wherein the wheel defines a first air passage having a first end and a second end, wherein the first end is at an axially outward side of the wheel;
    a hub adapter connected to the wheel, wherein the hub adapter defines a tire side air passage which extends from an axially outward surface of the hub adapter to an opposite surface of the hub adapter, wherein a first end of the tire side air passage abuts the first end of the first air passage; and
    a valve assembly connected to the hub adapter, wherein the valve assembly comprises a valve and defines a hub side air passage and a tire side air passage, wherein a first end of the tire side air passage of the valve assembly abuts a second end of the tire side air passage of the hub adapter.

2. The system of claim 1, wherein the wheel is a single-piece wheel.

3. The system of claim 1, wherein the wheel is a multi-piece wheel.

4. The system of claim 1, wherein the first end of the first air passage is at a transverse face-section of the wheel.

5. The system of claim 1, wherein the first end of the first air passage is at a flared flange section of the wheel.

6. The system of claim 1, wherein a second end of the first air passage is at a barrel section of the wheel.

7. The system of claim 1, wherein at least a portion of the first air passage is defined by an outer rim of the wheel.

8. The system of claim 1, wherein at least a portion of the first air passage is defined by an inner rim of the wheel.

9. The system of claim 1, wherein at least a portion of the first air passage is defined by a transverse face section of the wheel.

10. The system of claim 1, wherein at least a portion of the first air passage is defined by a spoke of the wheel.

11. The system of claim 1, wherein at least a portion of the first air passage is defined by a barrel section of the wheel.

12. The system of claim 1, wherein at least a portion of the first air passage is defined by a flared flange section of the wheel.

13. The system of claim 1, wherein the hub adapter further comprises a hub side air passage.

14. The system of claim 13, wherein a first end of the hub side air passage of the hub adapter abuts a hub port.

15. The system of claim 13, wherein the first end of the hub side air passage of the hub adapter abuts a radial hub port.

16. The system of claim 13, wherein a second end of the hub side air passage of the hub adapter abuts a first end of the hub side air passage of the valve assembly.

17. The system of claim 1, wherein the valve of the valve assembly is positioned within an exterior surface of the valve assembly.

18. The system of claim 1, further comprising a second valve positioned between the hub adapter and the first air passage.

19. The system of claim 18, wherein the second valve is configured to maintain pressure in a chamber of a tire mounted to the wheel if:
    the hub adapter is removed from the wheel; and
    the valve assembly removed from the hub adapter.

20. The system of claim 18, wherein the second valve is positioned at least partially within the wheel.

* * * * *